May 29, 1956  H. C. REINHART  2,747,613

DUAL GAS VALVES

Filed Oct. 10, 1951  3 Sheets-Sheet 1

Harold C. Reinhart,
Inventor.
Koenig and Pope,
Attorneys.

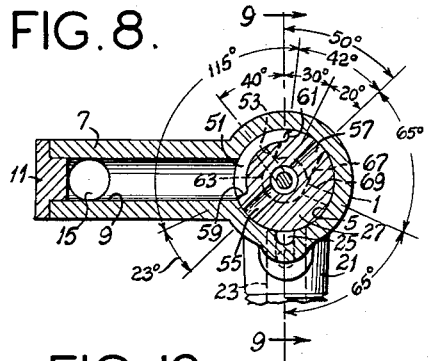
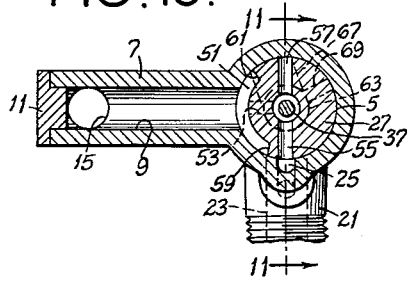
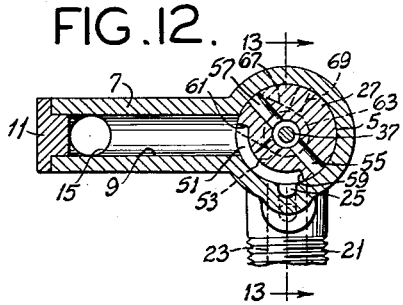
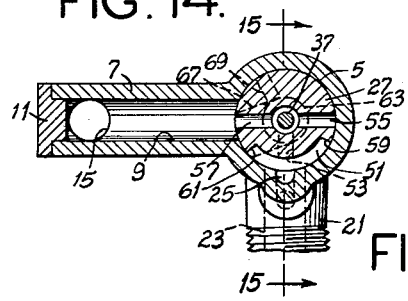
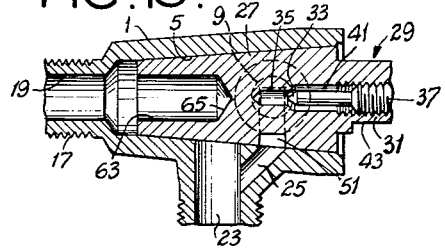
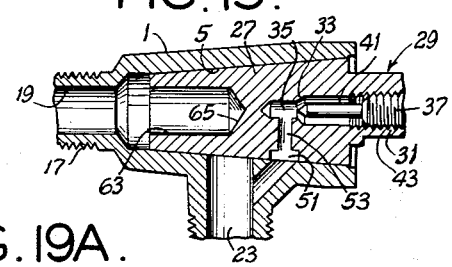
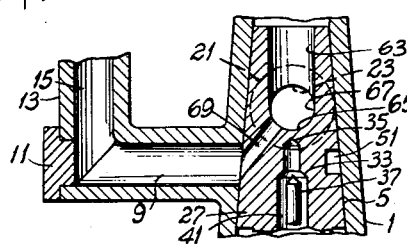

May 29, 1956 H. C. REINHART 2,747,613
DUAL GAS VALVES

Filed Oct. 10, 1951 3 Sheets-Sheet 3

Harold C. Reinhart,
Inventor.
Koenig and Pope,
Attorneys.

United States Patent Office 2,747,613
Patented May 29, 1956

2,747,613

DUAL GAS VALVES

Harold C. Reinhart, Ferguson, Mo., assignor to Magic Chef, Inc., a corporation of New Jersey Application October 10, 1951, Serial No. 250,620

7 Claims. (Cl. 137—625.16)

This invention relates to valves, and more particularly to dual gas valves.

Among the several objects of the invention may be noted the provision of an improved dual outlet gas valve having a single rotary valve member for controlling the supply of gas to both outlets in such manner as selectively to supply gas only to a first outlet or to supply gas simultaneously to both outlets; the provision of a valve of this class particularly adapted for controlling a supply of gas to the simmer burner and the main burner of a dual gas range burner, in which case the first outlet is the simmer burner outlet and the second is the main burner outlet, the valve being usable for all gases; the provision of the valve of this class wherein the valve member is rotary from a fully closed or "Off" position to a position of minimum flow to the first outlet, further rotary to a position of maximum flow to the first outlet, further rotary to a position of minimum flow to the first outlet, without flow to the second outlet in any of these positions, then further roary to a position of minimum flow to both outlets, and finally further rotary to a final position of maximum flow to both outlets; the provision of a valve of this class having means whereby the minimum flow to the first outlet may be readily fixed at different rates; the provision of the valve of this class wherein the second or main burner outlet is on the center line or axis of the rotary valve member and the first or simmer burner outlet is a lateral outlet; and the provision of a valve of the class described having improvements which make it more economical to manufacture and assemble the parts thereof, and easy to disassemble. Other features will be in part apparent and in part pointed out hereinafter.

The invention accordingly comprises the elements and combinations of elements, features of construction, and arrangements of parts which will be exemplified in the structures hereinafter described, and the scope of which will be indicated in the following claims.

In the accompanying drawings, in which several of various possible embodiments of the invention are illustrated, Fig. 1 is a plan of a valve embodying the invention;

Fig. 8 is a transverse section taken on line 8—8 of Figs. 1 and 9, with a rotary valve member of the valve in "Off" position;

Fig. 9 is a full longitudinal vertical section taken on line 9—9 of Fig. 1, with the rotary valve member in "Off" position;

Figure 1:
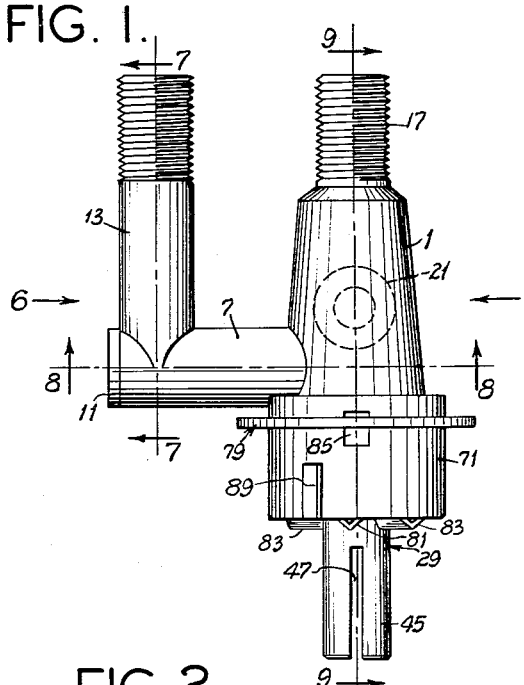
Figure 4:
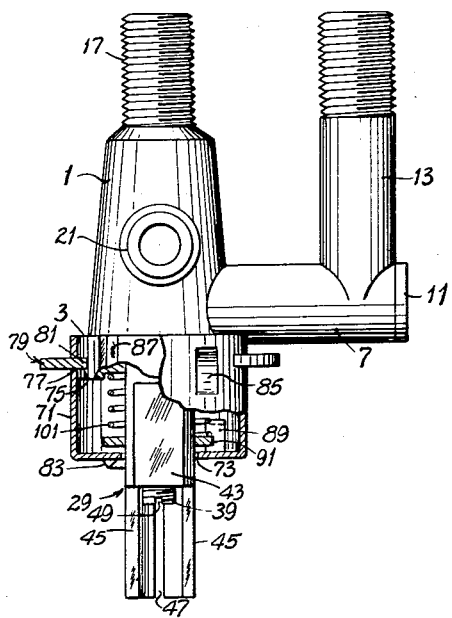
Fig. 4 is a bottom plan of Fig. 1, with parts broken away and shown in section.
Figure 2:
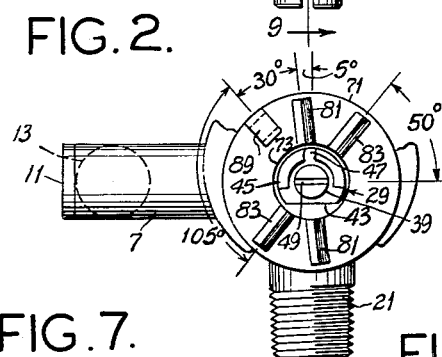
Fig. 2 is a front end view of Fig. 1, with parts broken away.
Figure 3:
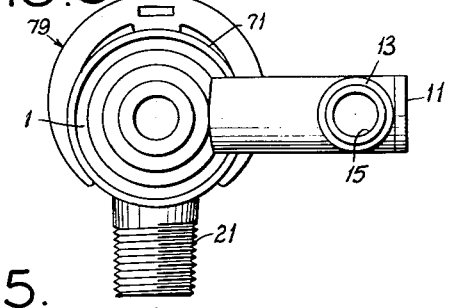
Fig. 3 is a rear end view of Fig. 1.
Figure 7:
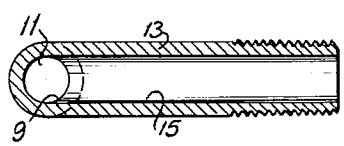
Fig. 7 is a section taken on line 7—7 of Fig. 1.
Figure 5:
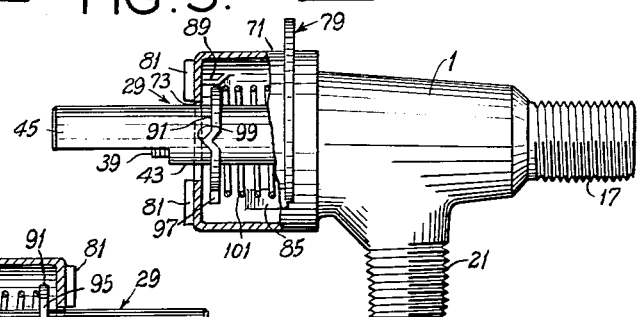
Fig. 5 is a right side elevation of Fig. 1, as viewed in the direction of the arrow 5 in Fig. 1, with parts broken away and shown in section.
Figure 6:
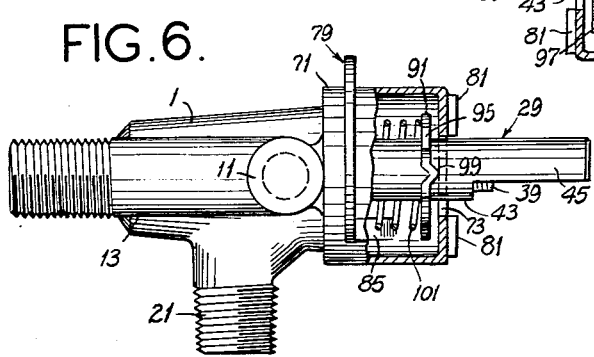
Fig. 6 is a left side elevation of Fig. 1, as viewed in the direction of the arrow 6 in Fig. 1, with parts broken away and shown in section.
Figure 16:
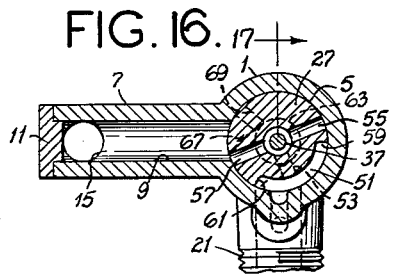
Figure 17:
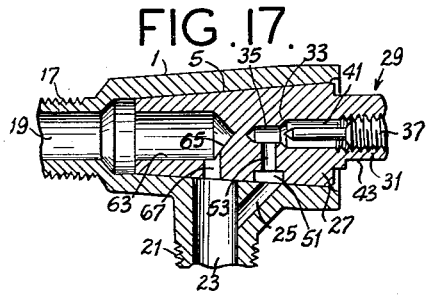
Figure 18:
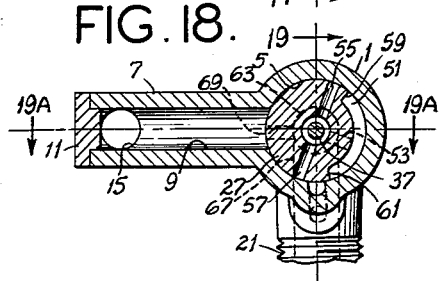
Figure 19:
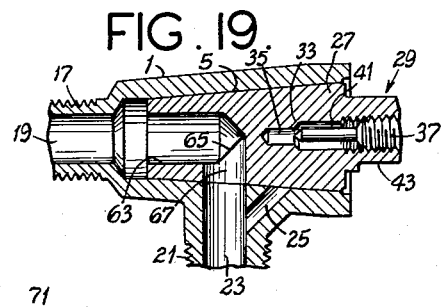
Figure 22:
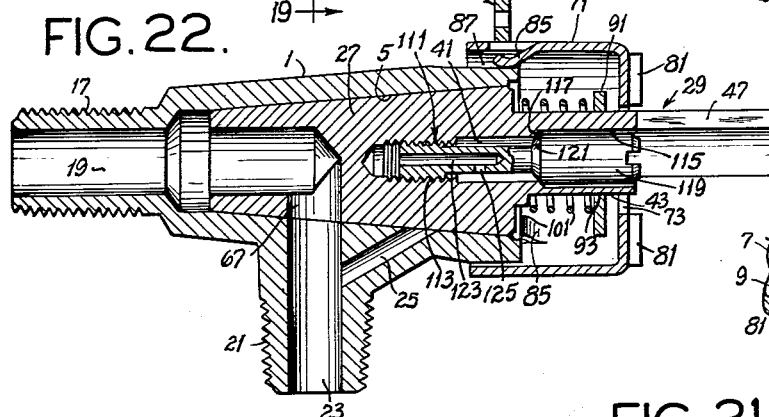
Figure 20:
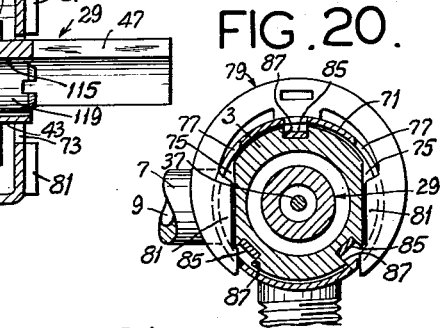
Figure 21:
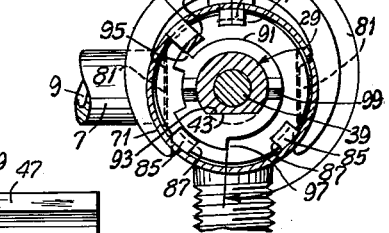
Figure 23:
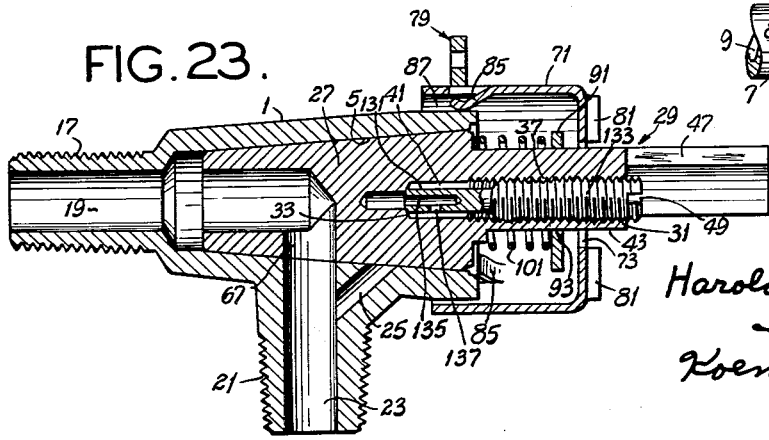

Figs. 10 and 11 are sections similar to Figs. 8 and 9, respectively, with the rotary valve member in a first open position, the valve member in Fig. 11 being in section on line 11—11 of Fig. 10;

Figs. 12 and 13 are sections similar to Figs. 8 and 9, respectively, with the rotary valve member in a second open position, the valve member in Fig. 13 being in section on line 13—13 of Fig. 12;

Figs. 14 and 15 are sections similar to Figs. 8 and 9, respectively, with the rotary valve member in a third open position, the valve member in Fig. 15 being in section on line 15—15 of Fig. 14;

Figs. 16 and 17 are sections similar to Figs. 8 and 9, respectively, with the rotary valve member in a fourth open position, the valve member in Fig. 17 being in section on line 17—17 of Fig. 16;

Figs. 18 and 19 are sections similar to Figs. 8 and 9, respectively, with the rotary valve member in a fifth open position, the valve member in Fig. 19 being in section on line 19—19 of Fig. 18;

Fig. 19A (sheet 2) is a section taken on line 19A—19A of Fig. 18;

Fig. 20 is a vertical transverse section taken on line 20—20 of Fig. 9;

Fig. 21 is a vertical transverse section taken on line 21—21 of Fig. 9;

Fig. 22 is an enlarged view similar to Fig. 9 illustrating a modification; and,

Fig. 23 is an enlarged view similar to Fig. 9 showing a further modification.

Similar reference characters indicate corresponding parts throughout the several views of the drawings.

Referring to Figs. 1–9 of the drawings, a valve of this invention is shown to comprise a valve body 1 of conical shape with a cylindrical formation 3 at its large end. The valve body has a tapered bore 5 (Fig. 9), the large end of the bore being at the large end of the valve body. The valve body has a lateral branch 7 extending at right angles to the axis of the bore 5 adjacent its large end. Branch 7 is bored to provide a first and lateral outlet 9 from the bore 5. As regards the use of the valve for controlling the supply of gas to a gas range burner having a main and a simmer burner, the lateral outlet 9 is the simmer burner outlet. The end of the branch 7 is closed after boring by a plug 11. A tube 13 extends parallel to and alongside the body 1 from adjacent the outer end of the branch 7 as an extension of the branch, providing a passage 15 forming a continuation of the outlet 9. The valve body 1, at its small end, has a hollow cylindrical extension 17 providing a passage 19 forming a second and axial outlet from the bore 5. As regards the use of the valve for controlling the supply of gas to a gas range burner as above described, the outlet 19 is the main burner outlet. The end of the tube 13 and the extension 17 are externally threaded for application to each of a conventional hood (not shown) cooperative with a conventional needle valve member (not shown), one of which may be fixed in the end of the tube and one in the end of the extension.

The valve body 1 has an externally threaded lateral gas inlet nipple 21 at right angles to the branch 7 and thus at right angles to the longitudinal plane of the first outlet 9. The nipple is in a lateral plane between the branch 7 and the small end of the body. The nipple has a bore 23 leading straight into the tapered bore 5, and a smaller bore 25 inclined at an angle of 45° to the bore 23, leading from the latter into the bore 5 at a point in the lateral plane of the first valve outlet 9. The boring of 23 is accomplished from the large open end of the body 1. Both bores 23 and 25 are in a common longitudinal plane at right angles to the longitudinal plane of the outlet 9. The bore 25 is hereinafter referred to as the first lateral inlet passage and constitutes a simmer burner inlet, and the bore 23 is hereinafter referred to as the second lateral valve inlet passage and constitutes a main burner inlet.

A conical valve member or plug 27 has a rotary sealing fit in the tapered bore 5. This valve member has an integral axial stem 29 extending from its large end. At 31 is indicated an axial bore extending through the stem and partially into the valve member to a conical shoulder at 33, from which there extends a short axial bore or chamber 35 of reduced diameter as regards the bore 31. A needle valve member 37 is adjusted threadedly in the bore 31 with its pointed end adjacent the shoulder 33. The bore or chamber 35 extends past the lateral plane of the inner end of the first or simmer burner inlet passage 25 (see Fig. 9), and is closed at its inner end. The threaded head 39 of the needle valve member closes the bore 31 to define a second chamber 41, this chamber and the bore or chamber 35 being in throttled communication through the restricted orifice between the pointed end of the needle valve member and the shoulder 33. Toward its inner end, the valve stem 29 is of cylindrical form with a flat side 43. Toward its outer end, the stem 29 is of generally semi-cylindrical C-shaped cross section as indicated at 45. This C-shaped portion 45 of the stem is longitudinally slotted as indicated at 47 for frictional springwise reception of a knob (not shown). The head 39 of the needle valve 37 is slotted at its outer end as indicated at 49 to receive the end of a screw driver inserted endwise in the bore in the stem for longitudinally adjusting the needle valve member.

The valve member or plug 27 is formed with a lateral peripheral groove 51 in the lateral plane of the first inlet passage 25 and the first valve outlet 9. As herein illustrated, this groove has an arcwise span of approximately 115° (see Fig. 8). A radial passage 53 (appearing in solid lines in Fig. 15) leads from the groove 51 to the bore 35. The valve member or plug 27 also has two diametrically opposed inclined passages 55 and 57, both in the same longitudinal plane on opposite sides of the valve axis. These extend from diametrically opposite points in the periphery of the valve member, both these points being located in the lateral plane of both the first valve outlet 9 and the inner end of the first inlet passage 25, to the chamber 41 at an angle of 45° to the valve axis (see Fig. 11). The plane of the passages 55 and 57 is at right angles to the longitudinal plane of the radial passage 53. The end of the groove 51 adjacent the outer end of the passage 55 is designated 59, and the end of the groove 51 adjacent the outer end of the passage 57 is designated 61. As illustrated herein, the end 59 of the groove is spaced arcwise approximately 23° from the center of the outer end of the passage 55, and the end 61 of the groove is spaced arcwise approximately 42° from the center of the outer end of the passage 57 (see Fig. 8).

The valve member or plug 27 also has an axial bore 63 in its small end (its inner end). This bore extends past the second valve inlet passage 23 but terminates at 65, short of the inner end of the bore 35. Valve member 27 also has a radial passage 67 (appearing in solid lines in Figs. 11, 17 and 19) in the lateral plane of the second or main burner inlet passage 23. This leads from the periphery of the valve member 27 to the bore 63. It is located in a longitudinal plane between the longitudinal plane of the passage 53 and the longitudinal plane of the passages 55 and 57 at an angle of approximately 20° to the plane of passages 55 and 57 (see Fig. 8). It has the same relatively large cross section as the second inlet passage 23. The valve member 27 also has a passage 69 (appearing in solid lines in Fig. 19A) inclined at 45° to the valve axis extending from the inner end 65 of the bore 63 to a point in the periphery of the valve member in the lateral plane of the first valve outlet 9. This passage 69 is located in a longitudinal plane at an angle of approximately 65° with respect to the plane of the passage 57 on the opposite side of the valve axis from the radial passage 53 (see Fig. 8).

The "Off" position of the valves 27 illustrated in Figs. 8 and 9 is that in which the longitudinal plane of the passages 55 and 57 is at an angle of approximately 50° to the longitudinal plane of the inlet passages 23 and 25, with the groove 51 toward the first valve outlet 9. With the valve member in this position, both inlet passages 23 and 25 are blocked (Fig. 9). The plane of the flat 43 on the valve stem is made to be parallel to the longitudinal plane of the outlet 9 (at right angles to the longitudinal plane of inlet passages 23 and 25) when the valve member is in "Off" position. The valve, as illustrated, is mounted with the nipple 21 extending vertically downward. Accordingly, in the "Off" position of the valve member, the flat 43 is horizontal and facing downward (see Fig. 2), the plane of passages 55 and 57 is inclined upward to the right as viewed in Fig. 8, at an angle of approximately 50° to the vertical, the radial passage 53 is inclined upward to the left at an angle of approximately 40° to the vertical, the radial passage 67 is inclined upward to the right at an angle of approximately 30° to the vertical, and the longitudinal plane of the passage 69 is inclined downward to the right at an angle of approximately 65° to the vertical. The end 59 of the groove 51 is positioned adjacent the lower edge of the inner end of the first valve outlet 9.

Upon turning the valve member 27 counterclockwise from its "Off" position as viewed in Fig. 8 through an angle of approximately 50°, the longitudinal plane of passages 55 and 57 is brought to the vertical position illustrated in Fig. 10, with the outer end of passage 55 in register with the first inlet passage 25. This is a first open valve position of minimum auxiliary flow only, in which gas flows from the inlet passage 25 through the passage 55 to the second chamber 41 (see Fig. 11), thence through the restricted orifice between the pointed end of the needle valve member 37 and the shoulder 33 into the bore or first chamber 35, thence through the radial passage 53 to the groove 51 (see Fig. 10), and thence out through the first valve outlet 9 (with which the groove 51 is in register). The second inlet passage 23 is blocked (see Fig. 11) so that no gas flows to the second valve outlet 19. The passages 57 and 69 are blocked at their outer ends. It will be seen that the chamber 41, the restricted orifice between the pointed end of the needle valve member 37 and the shoulder 33, and the bore or chamber 35 together constitute a throttling passage through which throttled communication is established from the first inlet passage 25 to the first valve outlet 9, thereby to establish a minimum flow condition. The throttling may be varied to vary the rate of flow by adjusting the needle valve member 37.

Upon turning the valve member 27 further counterclockwise, the groove 51 comes into direct open communication with the first inlet passage 25, as will be apparent from Fig. 12. This shows the valve member turned counterclockwise about 40° from its Fig. 10 position. This provides for maximum direct flow of gas without throttling from the inlet passage 25 to the first valve outlet 9 via the open passage constituted by the groove 51, by-passing the fixed throttle constituted by the chamber 41, the restricted orifice at 33 and the bore 35 (see Fig. 13). The second inlet passage 23 remains blocked so that no gas flows to the second outlet 19 (Fig. 13). The maximum flow to the outlet 9 occurs in any position of the valve member between an initial position wherein the first inlet passage 25 has just been fully opened to the groove 51 and a final position wherein the trailing end 61 of the groove 51 approaches the lower edge of the inner end of the outlet 9 and starts to throttle flow from the groove into the outlet. As the trailing end 61 of the groove 51 approaches the lower edge of the inner end of the outlet 9, the outer end of the passage 57 comes into register with the outlet 9, and eventually the longitudinal plane of the passages 55 and 57 reaches the horizontal position illustrated in Fig. 14, coplanar with the outlet 9.

The position of the valve member 27 shown in Figs. 14 and 15 is another position of minimum auxiliary flow only, in which gas flows from the inlet passage 25 through the throttling passage in the valve member 27 to the outlet 9; the course of the flow being from the inlet passage 25 to the groove 51, thence through the radial passage 53 to the bore or first chamber 35 (see Fig. 15), into the second chamber 41 through the restricted orifice around the pointed end of the needle valve member, thence through the passage 57 to the outlet (see Fig. 14). The main inlet passage 23 is still blocked. The valve member reaches this second minimum auxiliary flow position upon rotation through a total angle of about 140° from its "Off" position. It will be noted that, while there is a reversal of direction of flow as between the Fig. 8 and the Fig. 14 minimum auxiliary flow positions, the throttling is the same in each case, and gas is supplied to the outlet 9 at the same minimum rate.

As yet, there has been no flow of gas to the main outlet 19. Upon turning the valve member further counterclockwise about 25° from its Fig. 14 position to the position shown in Figs. 16 and 17, the radial passage 67 reaches a partly open position of minimum restricted communication with respect to the second inlet passage 23, wherein the lower edge of the passage has just crossed the left edge of the inner end of the second inlet passage. This is illustrated in Fig. 17 by the reduced width of 67. This starts the flow of gas from the second inlet passage 23 to the second valve outlet 19 at a minimum rate, the gas flowing via the passage 67 to 63. The outer end of the passage 69 is blocked (see Fig. 16). The outer end of the passage 57 is still open to the first valve outlet 9, and the groove 51 is still open to the inner end of passage 25 so that throttled flow is maintained from the passage 25 to the outlet 9 in the same manner as in Fig. 14.

Upon turning the valve member 27 further counterclockwise from its Fig. 16 position to the final position illustrated in Figs. 18, 19 and 19A, which is about 210° from its "Off" position, the radial passage 67 reaches a downward vertical position fully open to the second inlet passage 23. Thereupon, gas is supplied at a maximum rate to the second valve outlet 19. In this final position of the valve member, the outer end of the passage 69 is open to the first valve outlet 9 (see Fig. 19A), and gas flows unthrottled at a maximum rate from the bore 63 through passage 69 to the outlet 9.

A cylindrical cup-shaped cap 71 is telescoped on the cylindrical formation 3 at the large end of the valve body 1. In the end wall of the cap is a central opening 73 receiving the stem 29 of the valve member or plug 27. In the cylindrical formation 3 on opposite sides of the body 1 are parallel lateral grooves 75 (see Fig. 20). The cap has slots 77 at opposite sides thereof aligned with the grooves. Reference character 79 designates a member having keying elements 81 slidably keyed in the slots and grooves to hold the cap to the body 1. More particularly, the member 79 is a flat C-shaped stamping, the sides of which constitute the keying elements 81. The member 79 may be withdrawn laterally from the slots and grooves (upwardly as viewed in Fig. 20) for removal of the cap.

The end wall of the cap, which is inward of the inner end of the C-shaped part 45 of the stem 29, is formed with a pair of diametrical channels or grooves 81 and 83 at an angle of 45° to one another. The cap is held to the valve body 1 in such a position that the groove 81 is oriented 5° off vertical in counterclockwise direction and the groove 83 is accordingly oriented 50° off horizontal in counterclockwise direction as viewed in Fig. 2. This orientation is determined by the engagement of integral tongues 85 formed from the material of the cap in longitudinal grooves 87 in the cylindrical formation 3 (see Figs. 9, 20 and 21). The grooves and tongues are so spaced arcwise as to preclude any possibility of assembly of the cap on the body 1 at other than the proper angle. This orientation is also proper for alignment of slots 77 with the grooves 75. The cap is also formed with a stop 89 struck from the material of the cap partly in its side wall and partly in its end wall, the stop being located 105° in clockwise direction from the lower end of the groove 83 and 30° in counterclockwise direction from the upper end of the groove 81 (see Fig. 2).

A stop collar or washer 91 is slidable on the flat part 43 of the stem 29, but keyed against rotation relative to the stem by having a flat side 93 (Fig. 21) in its central opening. This collar 91 is formed with peripheral projections providing shoulders 95 and 97 spaced arcwise 210° plus the arcwise span of the stop 89. The collar is also formed with a diametrical ridge 99 parallel to the flat 93 (and 43). As viewed in Fig. 21, with the diametrical ridge 99 horizontal, the shoulder 95 is oriented 35° plus half the arcwise span of stop 89 off vertical in counterclockwise direction.

The ridge 99 on the collar faces the end wall of the cap to be engageable in the grooves 81 and 83. A coil compression spring 101 surrounding the stem 29 is compressed between the collar and the end of the valve member 27 to bias the collar against the end wall of the cap and the valve member into the tapered bore 5.

The "Off" position of the valve member 27 is determined by engagement of the shoulder 95 with the stop 89 (Fig. 21). When the valve member is turned counterclockwise approximately 50° from its "Off" position, the ridge 99 engages in the groove 83 with an audible click, and signals the user by both the senses of feel and hearing that the valve member is in the first minimum auxiliary flow position (Figs. 10 and 11). Upon turning the valve member further counterclockwise 45°, the ridge 99 engages in the groove 81 with an audible click. This signals the user that the valve member is in a position of maximum auxiliary flow. Upon rotation of the valve member through 210° clockwise from its "Off" position, the shoulder 97 engages the stop 89 to prevent further turning of the valve member.

Fig. 22 shows a modification of the above-described construction wherein throttling of the flow of gas to the outlet 9 is accomplished by using what I refer to as an orifice member, this being generally designated 111, instead of the needle valve member 37. In the Fig. 22 construction, the valve body is modified over the Fig. 9 construction to the extent that the bore 35 is tapped as indicated at 113, and the bore 31 is enlarged at its outer end, as indicated at 115, and is not threaded. At the inner end of the enlargement 115 is a conical seat 117. The member 111 is a screw member and is threaded in the bore 35. It has a head 119 received in the enlargement 115. The head has a conical shoulder 121. Member 111 is threaded in the bore 35 to the point where shoulder 121 seals against the conical seat 117. Member 111 has an axial bore or passage 123 and a radical orifice 125 providing for throttled communication as between the chamber 41 and the bore 35. The degree of throttling is determined by the size of the orifice 125. To obtain different minimum flow rates, different members 111 having different sizes of orifice 125 are used.

Fig. 23 shows a further modification wherein throttling of the flow of gas to the outlet 9 is accomplished by using an orifice member somewhat like that shown in Fig. 22 and wherein the valve member is the same as that shown in Fig. 9 to provide for interchangeable use of a needle valve 37 or an orifice member. The Fig. 23 orifice member is shown to consist of a tubular stem 131 having a head 133 threaded in the bore 31 to the point where the end of the stem sealingly engages the conical shoulder 33. The passage in the stem is designated 135 and the stem has a radial orifice 137 providing for throttled communication as between the chamber 41 and the bore 35. The degree of throttling is determined by the size of the orifice 137. To obtain different flow rates, different orifice members having different sizes of orifice 137 may be used.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. A valve for controlling the flow of gas to the simmer burner and main burner of a dual gas range burner, comprising a valve body having a bore opening at one end of the body to a main burner outlet, the body having a simmer burner inlet and a main burner inlet leading laterally into the bore and spaced axially with respect to the body with the main burner inlet toward said one end of the body, the body also having a lateral simmer burner outlet leading from the bore in the lateral plane of the inner end of the simmer burner inlet, a valve member rotary in the body having axially spaced first and second chambers therein in throttled communication through a restricted orifice, said chambers extending axially in the valve member with the first chamber intersecting the lateral plane of the inner end of the simmer burner inlet and the second chamber being located toward the other end of the valve body, said valve member also having a peripheral groove in the lateral plane of the simmer burner inlet and outlet, a first passage leading from said groove to the first chamber, a second and a third passage leading from opposite points in the periphery of the valve body in the lateral plane of the simmer burner inlet and outlet to the second chamber, a fourth passage in the lateral plane of the main burner inlet leading into a fifth axial main burner outlet passage in the end of the valve body toward the main burner outlet, and a sixth passage leading from the main burner outlet passage to a point in the periphery of the valve body in the lateral plane of the simmer burner outlet, the arcwise span of the groove and the angular relationship of the groove and the passages being such that the valve member has an "Off" position in which both inlets are blocked, a first open position in which gas flows only from the simmer burner inlet to the simmer burner outlet via said second passage, the second chamber, the restricted orifice, the first chamber, said first passage and the groove, a second open position in which gas flows directly from the simmer burner inlet to the simmer burner outlet via the groove, a third open position in which gas flows from the simmer burner inlet to the simmer burner outlet via the groove, said first passage, the first chamber, the restricted orifice, the second chamber, and the third passage, a fourth open position of restricted flow from the main burner inlet to the main burner outlet through the main burner outlet passage and concomitant flow to the simmer burner outlet as in the third position, and a fifth position in which gas flows unrestricted from the main burner inlet to the main burner outlet through the main burner outlet passage and from the main burner outlet passage through said sixth passage to the simmer burner outlet.

2. A valve as set forth in claim 1 wherein the inlets are in a common longitudinal plane and the simmer burner outlet is in a longitudinal plane at right angles thereto.

3. A valve as set forth in claim 1 wherein the restricted orifice is provided by a needle valve axially adjustable in the valve member.

4. A valve as set forth in claim 1 wherein the restricted orifice is a radial orifice in a tubular stem on a member removably mounted in the valve member.

5. A valve as set forth in claim 1 wherein the chambers are provided by an axial bore in the valve member from its other end having an extension of reduced diameter, and the restricted orifice is provided by a needle valve member threaded in said bore with its pointed end adjacent the entrance to the reduced-diameter bore extension.

6. A valve as set forth in claim 1 wherein the chambers are provided by an axial bore in the valve member from its other end having an extension of reduced diameter, and the restricted orifice is a radial orifice in a tubular member threaded in the reduced-diameter bore extension.

7. A valve as set forth in claim 1 wherein the chambers are provided by an axial bore in the valve member from its other end having an extension of reduced diameter, and a member threaded in the bore having a tubular stem with its inner end in sealing engagement with a shoulder at the entrance of the reduced-diameter bore extension, the restricted orifice being a radial orifice in the stem.

References Cited in the file of this patent

UNITED STATES PATENTS

| | | |
|---|---|---|
| 2,042,186 | Peterson | May 26, 1936 |
| 2,165,096 | Frechette | July 4, 1939 |
| 2,249,982 | Rutherford | July 22, 1941 |
| 2,335,519 | Lamar | Nov. 30, 1943 |
| 2,448,654 | Anderson | Sept. 7, 1948 |
| 2,595,160 | Miller | Apr. 29, 1952 |